(12) United States Patent
Wilson

(10) Patent No.: US 9,442,820 B2
(45) Date of Patent: *Sep. 13, 2016

(54) COMPUTER-IMPLEMENTED METHODS AND SYSTEMS FOR TESTING ONLINE SYSTEMS AND CONTENT

(71) Applicant: AOL Inc., Dulles, VA (US)

(72) Inventor: Jeffrey T. Wilson, Ashburn, VA (US)

(73) Assignee: AOL Inc., Dulles, VA (US)

( * ) Notice: Subject to any disclaimer, the term of this patent is extended or adjusted under 35 U.S.C. 154(b) by 83 days.

This patent is subject to a terminal disclaimer.

(21) Appl. No.: 14/317,085

(22) Filed: Jun. 27, 2014

(65) Prior Publication Data

US 2014/0310563 A1 Oct. 16, 2014

Related U.S. Application Data

(63) Continuation of application No. 14/040,882, filed on Sep. 30, 2013, now Pat. No. 8,793,534, which is a continuation of application No. 12/964,420, filed on Dec. 9, 2010, now Pat. No. 8,549,357.

(60) Provisional application No. 61/285,563, filed on Dec. 11, 2009.

(51) Int. Cl.
G06F 11/00 (2006.01)
G06F 11/36 (2006.01)
(Continued)

(52) U.S. Cl.
CPC ......... *G06F 11/3604* (2013.01); *G06F 11/008* (2013.01); *G06F 11/3692* (2013.01); *G06Q 30/02* (2013.01); *G06Q 30/0241* (2013.01); *H04L 67/02* (2013.01); *G06F 11/3055* (2013.01)

(58) Field of Classification Search
CPC ............. G06F 11/3604; G06F 11/008; G06F 11/3692; G06F 11/3055; G06F 11/26; G06F 11/3612; G06F 11/3688; G06Q 30/0241; G06Q 30/02; H04L 67/02
USPC .......... 714/37, 4.1, 4.2, 25, 26, 27, 33, 38.1, 714/38.14, 47.1, 57; 705/14.4, 14.41, 705/14.49, 14.73
See application file for complete search history.

(56) References Cited

U.S. PATENT DOCUMENTS

2002/0002595 A1 1/2002 Blumenau
2004/0225562 A1 11/2004 Turner
(Continued)

OTHER PUBLICATIONS

PCT International Search Report and Written Opinion, mailed on Apr. 28, 2011, in Application No. PCT/US2010/059807, 12 pages.
(Continued)

*Primary Examiner* — Joseph D Manoskey
(74) *Attorney, Agent, or Firm* — Finnegan, Henderson, Farabow, Garrett & Dunner LLP

(57) ABSTRACT

Computer-implemented methods and systems are provided for scanning web sites and/or parsing web content, including for testing online opt-out systems and/or cookies used by online systems. In accordance with one implementation, a computer-implemented method is provided for testing an opt-out system associated with at least one advertising system that uses cookies. The method includes transmitting a first request to an opt-out system, wherein the first request corresponds to a first test for testing at least one of the opt-out system and an advertising system; receiving a first stream sent in response to the first request; determining a first outcome of the first test based on the first stream; and generating a report based on the first outcome.

20 Claims, 7 Drawing Sheets

(51) Int. Cl.
  *G06Q 30/02* (2012.01)
  *H04L 29/08* (2006.01)
  *G06F 11/30* (2006.01)

(56) References Cited

U.S. PATENT DOCUMENTS

| | | |
|---|---|---|
| 2007/0180031 A1 | 8/2007 | Stern et al. |
| 2008/0281699 A1 | 11/2008 | Whitehead |
| 2009/0293018 A1 | 11/2009 | Wilson et al. |
| 2010/0153516 A1 | 6/2010 | Weinberg et al. |
| 2010/0332313 A1* | 12/2010 | Miller ............... G06F 17/30867 705/14.44 |
| 2011/0022461 A1* | 1/2011 | Simeonov .......... G06Q 30/0251 705/14.49 |
| 2011/0173071 A1 | 7/2011 | Meyer et al. |
| 2011/0191664 A1 | 8/2011 | Sheleheda et al. |
| 2011/0214163 A1 | 9/2011 | Smith et al. |

OTHER PUBLICATIONS

Network Advertising Initiative (NAI), Jul. 2008, XP002625105, Retrieved from the internet: URL:http/waybackmachine.org/20080101000000/http://www.networkadvertising.org, 20 pages.

"eHealth Service Availability", 2004. XP002625104, Retrieved from the Internet: URL:http://www.genesiscom.ch/e/2/products/downloads/ ServAvail_ds.pdf, 2 pages.

\* cited by examiner

| Present Cookie | Received | Result |
|---|---|---|
| None | Opt-Out Cookie | Opt-Out Cookie |
| 1 Ad.com Cookie | Opt-Out Cookie | Opt-Out Cookie |
| Opt-Out Cookie | Opt-Out Cookie | Opt-Out Cookie |

FIG. 6

COMPUTER-IMPLEMENTED METHODS AND SYSTEMS FOR TESTING ONLINE SYSTEMS AND CONTENT

CROSS-REFERENCE TO RELATED APPLICATION(S)

This application is a continuation of U.S. application Ser. No. 14/040,882, filed Sep. 30, 2013 (now allowed), which is a continuation of U.S. application Ser. No. 12/964,420, filed Dec. 9, 2010 (now U.S. Pat. No. 8,549,357), which claims the benefit of priority of U.S. Provisional Application No. 61/285,563, filed Dec. 11, 2009. Each of the above applications is incorporated by reference herein in its entirety.

BACKGROUND

1. Technical Field

The present disclosure generally relates to the field of automated monitoring technologies and techniques. More particularly, and without limitation, the disclosure relates to computer-implemented methods and systems for scanning web sites and/or parsing web content, including for testing online opt-out systems and/or online content.

2. Background

As greater numbers of people use the World Wide Web for communication, commerce, and other daily activities, they generate larger and larger volumes of traffic over the Internet. Because the benefits of commercializing the Internet can be tremendous, businesses increasingly take advantage of this traffic by advertising their products or services online. These advertisements may appear in the form of leased advertising space (e.g., "banners") on content websites, which are operated by "publishers" or "advertising networks" who control the website content and the availability and cost of the advertising space or "ad inventory."

In most cases, there is a need to keep track of the number of ad impressions, and/or the quantity of click and conversion events related to advertisements. An tracking system is, therefore, necessary to keep track of ad-related events. An advertiser may also have a marketing plan that identifies certain types of people as being target audience members for a given product or service. For example, the advertiser may wish to spend money only on users having certain demographics or personal interests. Alternatively, advertisers may be unsure of which people are most likely to respond to a given product, service, or advertisement. Therefore, advertisers may wish to obtain very specific information about the types of consumers viewing various types of web sites and responding to their advertisements. In some cases, advertisers may be willing to spend more money per impression, click, or conversion based on known information about those users interacting with the advertisements. As a result, publishers of content websites and/or facilitators of third party advertising networks (i.e., owners or operators of "advertising systems") may wish to obtain as much information as possible about consumers and other users browsing between web pages associated with an advertising network.

In order to implement tracking systems and/or obtain information for providing targeted ads, advertising systems may utilize tracking or browser cookies. In general, cookies comprise small sets of data that can be stored on users' computers by web browsers. Cookies may be implemented using so-called HTTP or web cookies, as well as other known types of cookies such as Flash cookies, "Evercookies," "Browser Fingerprinting," etc. When a user's computer visits a website or sends a request for a file such as a banner ad, an advertising system may transmit instructions to the user's web browser to store a cookie. The cookie is stored for a specified time and returned whenever the user's computer makes a subsequent visit to the website or another website on the same advertising network or system. The cookie may include one or more name-value pairs that specifies information, such as a user's preferences or browsing history. This information may allow the advertising system to track ad-related events and/or display targeted ads to the user based on collected information.

Cookies are also be used by online merchants and web service providers to support complex interactions and provide a better browsing experience for Internet users. For example, cookies may be used to facilitate a user log-in or provide information on the contents of an electronic shopping cart. Cookies can also be used to store registration information or secure information. As with cookies used by advertising systems, cookies used by online merchants and web service providers can be stored for a specified time and returned during subsequent requests by a user's web browser.

For privacy or other reasons, an individual who does not want to receive targeted or behavioral advertising may elect to "opt-out." In general, opting-out is a process by which a user may avoid receiving, for example, targeted advertisements, including those initiated by information collected from cookies or other data sources. Users may enroll in an opt-out system through various means, including a privacy policy page or an opt-out page of a website. Some websites, such as http://www.networkadvertising.org, enable users to selectively opt-out of targeted ad programs for one or more advertising networks or systems.

In some cases, opt-out system failures may occur that improperly prevent users from being opted-out. The owners or operators of the system that provide cookies may not be aware of opt-out system failures until they are alerted by a user or a third-party group. Efforts to manually ensure that an opt-out system operates properly may be unrealistic due to the large number of contingencies and possible failures that need to be checked on a continuous basis. Such efforts may require an enormous amount of resources. Furthermore, such efforts may not allow the owners or operators of an advertising system to respond effectively if a failure were to be discovered.

In view of the foregoing, there is a need for automated methods and systems that can accurately test online opt-out systems. There is also a need for such methods and systems, where the testing of an online op-out system can be conducted on a continuous basis for one or more systems and for a wide variety of contingencies and possible failures. Moreover, there is a need for improved methods and systems for testing online op-out systems that provide reporting features that enable owners or operators of advertising systems to respond effectively when a failure is detected.

The herein disclosed embodiments are directed to achieving one or more of the above-referenced goals, by providing methods and systems for analyzing and testing online opt-out systems.

SUMMARY

In one exemplary embodiment, the present disclosure is directed to a computer-implemented method for testing an online opt-out system associated with at least one advertising system that uses cookies. The method may include, for example, transmitting, by a test system, a first request to an opt-out system, wherein the first request corresponds to a first test for testing the opt-out system; receiving, by the test system, a first stream sent from the opt-out system in response to the first request; determining a first outcome of the first test by analyzing contents of the first stream; transmitting, by the test system, a second request to the opt-out system, wherein the second request corresponds to a second test for testing an advertising system that uses cookies; receiving, by the test system, an opt-out cookie sent from the advertising system; determining a second outcome of the second test by analyzing values of the opt-out cookie; and generating a report based on at least one of the first outcome and the second outcome.

In another exemplary embodiment, the present disclosure is directed to a computer-implemented method for testing an opt-out system associated with at least one advertising system that uses cookies. The method may include, for example, transmitting, by a test system, a first request to an opt-out system, wherein the first request corresponds to a first test for testing at least one of the opt-out system and an advertising system that uses cookies; receiving, by the test system, a first stream sent in response to the first request; determining a first outcome of the first test based on the first stream; and generating a report based on the first outcome.

In another exemplary embodiment, the present disclosure is directed to a computer-implemented method for receiving, by an opt-out system, a first request from a test system, wherein the first request corresponds to a first test for testing the opt-out system that is associated with at least one advertising system that uses cookies; processing, by the opt-out system, the first request; transmitting, by the opt-out system, a first stream to the test system, wherein the first stream comprises an output of the processing; and transmitting, by the opt-out system, instructions to an advertising system to create an opt-out cookie and to transmit the opt-out cookie to the test system, wherein the test system determines an outcome of the first test based on at least one of the first stream and the opt-out cookie.

In another exemplary embodiment, the present disclosure is directed to a test system for testing an online system associated with at least one advertising system that uses cookies. The test system may include, for example, a storage configured to store at least one object for a first test for testing at least one of the online system and the advertising system; and a processor configured to: transmit a first request to at least one of the online system and the advertising system, wherein the first request corresponds to the first test, receive a first stream sent in response to the first request, determine a first outcome of the first test based on the first stream, and generate a report based on the first outcome.

In another exemplary embodiment, the present disclosure is directed to a computer-implemented method for testing an online system that uses cookies. The method may include, for example, generating a first request to the online system, wherein the first request corresponds to a test for testing at least one of an op-out condition and a cookie used by the online system; receiving, by a server system, a first stream sent in response to the first request; determining a first outcome of the first test based on the first stream; and generating a report based on the first outcome.

Additional objects and advantages will be set forth in part in the description which follows, and in part will be obvious from the description, or may be learned by practice of the embodiments of the invention. For example, the objects and advantages may be realized and attained by means of the elements and combinations particularly pointed out in the appended claims.

It is to be understood that both the foregoing general description and the following detailed description are exemplary and explanatory only and are not restrictive of embodiments thereof, as claimed.

BRIEF DESCRIPTION OF THE DRAWINGS

The accompanying drawings, which are incorporated in and constitute a part of this disclosure, illustrate several embodiments and aspects of the present disclosure, and together with the description, serve to explain certain principles of the invention. In the drawings:

FIG. 6 is a table for illustrating testing the settings of an opt-out cookie on a test system, consistent with a disclosed embodiment.

DESCRIPTION OF THE EMBODIMENTS

Figure 1:
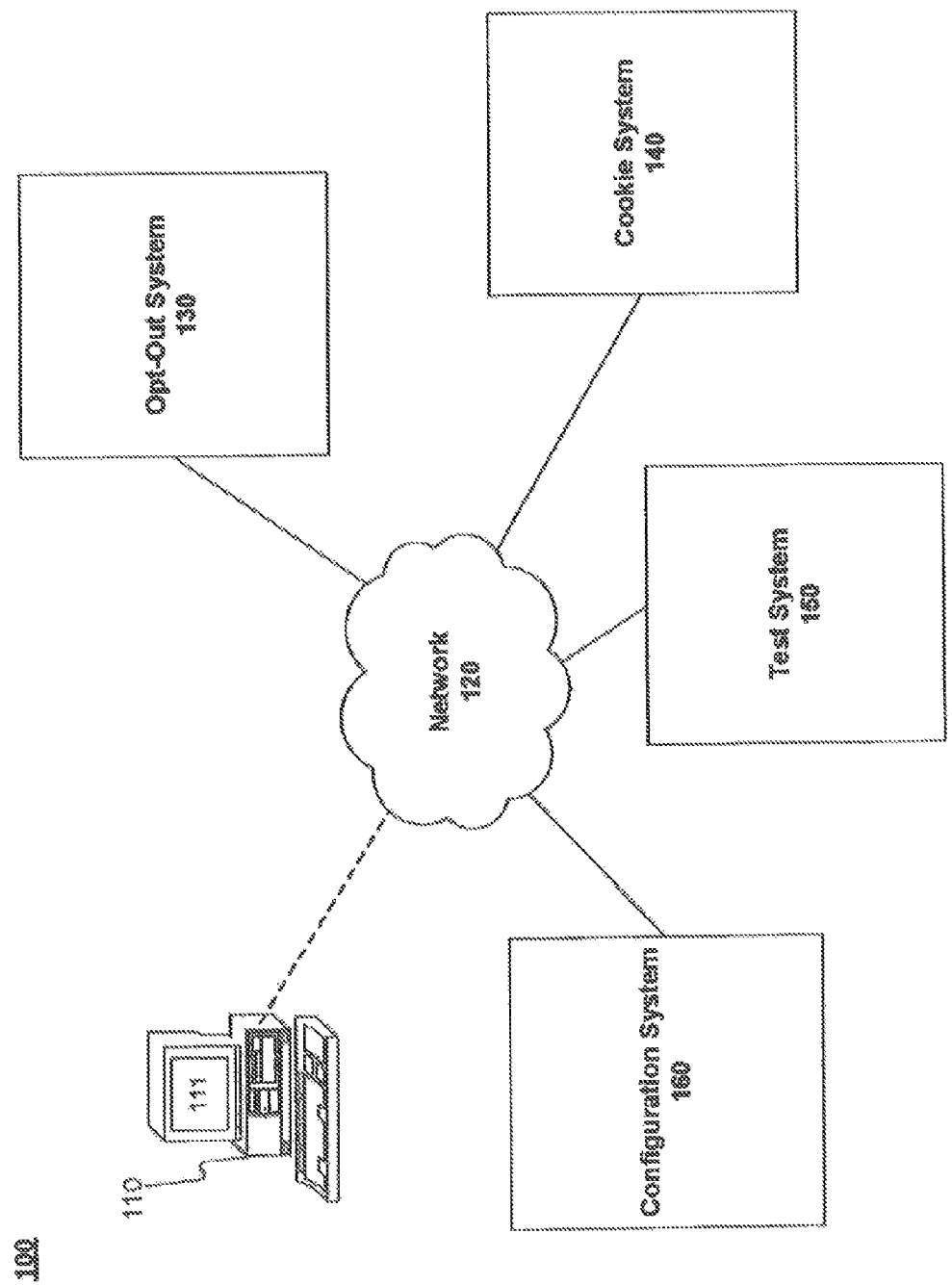
FIG. 1 is a block diagram illustrating an exemplary environment for implementing methods and systems for testing an online op-out system, consistent with certain disclosed embodiments.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the disclosed embodiments. For example, substitutions, additions, or modifications may be made to the components illustrated in the drawings, and the exemplary methods described herein may be modified by substituting, reordering, or adding steps to the disclosed methods. Accordingly, the following detailed description does not limit the embodiments. Instead, the proper scope is defined by the appended claims.

FIG. 1 illustrates an exemplary environment 100 for implementing methods and systems for testing an opt-out system, consistent with certain embodiments of the present disclosure. Environment 100 may include a user workstation 110, an opt-out system 130, an advertising system 140, a test system 150, and a configuration system 160, all disposed in communication with a network 120. Each one of user workstation 110, opt-out system 130, advertising system 140, test system 150, and configuration system 160 may include at least one processor (e.g., a central processing unit ("CPU")), a memory, a modem, an input device (e.g., keyboard, mouse, etc.), an output device (e.g., monitor), and at least one of internal storage (e.g., hard drive) and/or external storage (e.g., database on external servers, disk, flash memory, etc.). Network 120 may be any combination of networks, for example, an intranet or private network, and/or the Internet. Any combination of opt-out system 130, advertising system 140, test system 150, and configuration system 160 may be operated by one or more operators (e.g., advertising network).

User workstation 110 may include, for example, a personal computer, a laptop, a handheld computer, a personal digital assistant ("PDA"), a mobile device, a single server (or a component thereof), or any other computing platform capable of running a web browser 111 and receiving and storing cookies. Although only a single user workstation 110 is illustrated in FIG. 1, the exemplary environment 100 may include a plurality of such user workstations 110, each of which is associated with a different or unique user.

A user at user workstation 110 may choose to opt-out from having his/her usage patterns and web preferences collected for purposes of targeted or behavioral advertising programs implemented by, for example, advertising system 140. As further described below, a user at user workstation 110 may opt-out to maintain his/her privacy by enrolling in an opt-out system, such as opt-out system 130. The opt-out system 130 may prevent the user from being part of one or more advertising systems' targeted advertising programs, and also prevent user workstation 110 from receiving associated targeting or tracking cookies from advertising system 140.

Advertising system 140 may include a personal computer, a single server (or a component thereof), multiple servers arranged as part of an integrated or distributed system, a server farm, a network of servers, etc. Advertising system 140 may correspond to or be part of one or more advertising networks that provide online advertising. Advertising system 140 may include one or more servers or components for transmitting and receiving cookies. Additionally, advertising system 140 may include one or more servers or components for delivering online advertisements, such a plurality servers that are part of a content delivery network. While only a single advertising system 140 is illustrated in FIG. 1, it will be appreciated that the exemplary environment 100 may including a plurality of advertising systems 140 that are owned or operated by one or more entities. Further, there may be one or more opt-out systems 130, wherein each opt-out system 130 is associated with one or more advertising systems 140 that use cookies.

Advertising system 140 may be configured to transmit targeting or tracking cookies to user workstations of users that have not opted-out from receiving such cookies. These and other types of cookies may be transmitted when a user visits and browses one or more websites in, for example, an advertising network. As described above, cookies stored on non-opted-out users' workstations 110 may allow the advertising system 140 to track online usage and user preferences to transmit targeted advertising. In contrast, for users that have elected to opt-out from such cookies, no such targeting or tracking cookies may be utilized and, as a result, a user's workstation 110 of an opt-out user may only receive general or non-targeted advertisements.

To opt-out from receiving targeting or tracking cookies from one or more advertising systems 140, a user may open or initiate a web browser 111 on user workstation 110. Through browser 111, the user may navigate to a website associated with opt-out system 130. Once connected through network 120, the website of opt-out system 130 may be displayed to the user in browser 111, including web pages with various opt-out options. By way of example, the user may select elements on pages of the website displayed in browser 111 to opt-out from receiving targeted advertisements from one or more advertising systems 140. For instance, a list of different advertising systems or networks may be displayed to the user in browser 111. Additionally, or optionally, each listed advertising system or network may have a corresponding status. The status may indicate what kind of cookie (e.g., active cookie, opt-out cookie, no cookie), if any, user workstation 110 has previously received and stored. Based on the list, the user may elect to opt-out user workstation 110 for one or more advertising systems 140 that use targeting or tracking cookies.

Based on the opt-out options selected by a user, opt-out system 130 may then send instructions to corresponding advertising system(s) 140 to cause each such system to create and send an opt-out cookie to user workstation 110. In response, each advertising system 140 may create and send an opt-out cookie to user workstation 110. Opt-out system 130 may then display a message to the user in browser 111 whether user workstation 110 was successfully opted-out from each advertising system or network that the user selected.

After user workstation 110 receives an opt-out cookie from an advertising system 140, the advertising system 140 may not be able to track the activities of user workstation 110 when a user visits a website in the advertising network(s) associated with advertising system 140. Whenever browser 111 visits a website in the advertising network of advertising system 140, user workstation 110 may send a request (such as for a banner ad or other file) to advertising system 140. Along with the request, browser 111 will transmit any previously stored cookies associated with advertising system 140. If user workstation 110 has an opt-out cookie corresponding to the advertising network of advertising system 140, the opt-out cookie (e.g., with a value of "optout") will be transmitted back to the advertising system 140. Advertising system 140 may determine based on the opt-out cookie that user workstation 110 has opted-out of targeted advertising programs and, therefore, determine not to use targeting or tracking cookies to track any activity or behavior of the user of user workstation 110. As a result, only untargeted ads may be transmitted to user workstation 110.

Test system 150 may include a personal computer, a single server (or a component thereof), multiple servers arranged as part of an integrated or distributed system, a server farm, a network of multiple servers, etc. Test system 150 may also be adapted to run or emulate different workstations and operating systems, as well as web browsers (Internet Explorer, Safari, Firefox, Chrome, etc.). When implemented, test system 150 may automatically test whether an opt-out system is working properly. Among other things, test system 150 may send requests to opt-out system 130 and advertising system 140 through network 120. Test system 150 may also receive streams from opt-out system 130 and advertising system 140 through network 120.

Consistent with embodiments of the present disclosure, test system 150 may run a series of different tests periodically, at a predetermined interval (e.g., every hour). Settings of test system 150 may be configured before each test or series of different tests to simulate and analyze, for example, certain environmental conditions. Environmental conditions may include, by way of non-limiting examples, different privacy settings, different browsers, variations in computer host files (e.g., that may manage DNS settings), the presence of different anti-spyware software, changing locations of test system 150, different existing cookies present on test system 150, etc.

Consistent with embodiments of the present disclosure, test system 150 may simulate new environmental conditions after a series of different tests are completed. In addition, test system 150 may repeat (rerun) the series of different tests with the new environmental conditions. Test system 150 may also simulate a plurality of different environmental conditions during each interval, and run a series of different tests for each one of the environmental conditions.

In running a series of different tests, test system 150 may test that one or more opt-out systems 130 are functioning properly. As described above, each opt-out system 130 may allow a user to opt-out from receiving targeted advertising and associated cookies from one or more advertising systems 140. Testing opt-out system 130 may ensure, among other things, that a user can access and successfully complete or enroll in the opt-out process.

To conduct a test of opt-out system 130, test system 150 may send one or more requests to opt-out system 130. Each request may represent one or more requests in the form that a browser would send to opt-out system 130. In other words, test system 150 may emulate requests from the browser of a user who is trying to opt-out through a website associated with opt-out system 130. Parameters of a request may differ based on the test and the environmental conditions. Among other things, a test may check that the website of opt-out system 130 is functioning, check that web pages (e.g., opt-out pages, privacy policy page, opt-out links pages, etc.) of the website are operating properly, check that links between the web pages of the website are operating properly, check that necessary elements to selectively opt-out from various advertising networks or systems are present on the related web pages, check that if a user were to select any elements (e.g., an element to opt-out from an advertising network) that the opt-out system would respond appropriately, etc.

Test system 150 may receive a stream back from opt-out system 130 in response to the request(s) transmitted from test system 150. A stream may include one or more files, a text string, a character, a numerical value, a code, etc. Streams may be generated by opt-out system 130 after processing requests received from test system 150. Test system 150 may receive multiple individual streams in response to a single request. The number of streams received by test system 150 from each opt-out system 130 may vary based on the number of requests that are transmitted. In one embodiment, test system 150 may selectively receive or process only the streams test system 150 needs to determine an outcome of a test. Selectively receiving a stream may include determining whether the stream is necessary to determine the outcome of the test, and receiving or processing the stream only when the determination is positive.

Test system 150 may analyze a stream to identify relevant content within the stream that is desired to determine the outcome of a test. Test system 150 may perform any desired analysis and/or measurement of the identified content to determine the outcome of a test. For example, test system 150 may determine that a website/web-page associated with opt-out system 130 is functioning when a stream is received in the form of a specific response, such as an HTTP 200 OK result code, which indicates individually or with information provided in the response that the HTTP request has succeeded.

In accordance with embodiments of the present disclosure, test system 150 may perform one or more tests, as part of a series of different tests to determine whether opt-out system 130 or advertising system 140 properly recognizes the cookies stored on test system 150. Test system 150 may create different types of cookies (e.g., advertising network cookie, opt-out cookie, no cookie). Test system 150 may send a request to opt-out system 130 for opt-out system 130 to identify the types of cookies stored on test system 150. Test system 150 may receive a stream from opt-out system 130 including identification of a type of cookie stored on test system 150 for a particular advertising network or advertising system 140. Test system 150 may also test whether opt-out system 130 correctly identifies the type of cookies stored on test system 150 on a website associated with opt-out system 130. Test system 150 may further test that the correct indicator for identifying a type of cookie is properly displayed or otherwise indicated on a website associated with opt-out system 130. In accordance with an embodiment, test system 150 may test that the indicator is properly displayed by running a checksum on an image file of the indicator.

In accordance with additional embodiments, test system 150 may perform one or more tests to determine whether opt-out system 130 properly interacts with each corresponding advertising system 140. Test system 150 may also perform one or more tests to determine whether each advertising system 140 is responding correctly to the interaction with opt-out system 130. To perform a test relating to the interaction of opt-out system 130 and an advertising system 140, test system 150 may send a request for opt-out system 130 to prompt an advertising system 140 to run a script. Thereafter, the advertising system 140 may run the script to create an opt-out cookie and send the opt-out cookie to test system 150. The request simulates a selection (by a user) to opt-out test system 150 from the advertising network associated with the advertising system 140.

Test system 150 may send a request to opt-out system 130 to test that only the advertising systems 140 corresponding to advertising networks that are selected for the opt-out process and that are prompted to create opt-out cookies (e.g., if a user selects to opt-out only out of receiving cookies from a particular advertising network, only the advertising system corresponding to that advertising network is prompted to run a script to create an opt-out cookie). Test system 150 may send a request to an advertising system 140 to test that the correct script is called to create a cookie. The advertising system 140 may then run a script to create an opt-out cookie for test system 150 in response to a prompt or instruction from opt-out system 130.

In accordance with yet additional embodiments, test system 150 may then run tests to determine that test system 150 receives a proper opt-out cookie from each advertising system 140 based on the requests that test system 150 sent to opt-out system 130. After each advertising system 140 creates the opt-out cookie and sends the opt-out cookie to the test system 150, test system 150 may analyze the cookie to determine that values of the cookie are correct. For example, test system 150 may run a test to determine that the lifespan of the opt-out cookie is consistent with predetermined guidelines (e.g., no shorter than 3 or 5 years). Test system 150 may run other tests to determine that other values associated with an opt-out cookie are correct, such as: there is no unique ID parameter to track the cookie or personal information related to the user, all ID values are set to a dummy value (e.g., representing an "optout" value), tracking value is set to a predetermined tracking value for opt-out cookies (e.g., 0), etc. Test system 150 may also perform tests based on the type or form of opt-out cookie (e.g., HTTP cookie, a Flash cookie, "Evercookie," "Browser Fingerprinting," etc.). Test system 150 may also run tests to determine whether other cookies, besides opt-out cookies, transmitted from advertising system 140 have proper values. For example, test system 150 may run a test to determine that the lifespan of an ad cookie is no longer than a predetermined amount of time.

Test system 150 may run tests to determine whether the opt-out cookie received from an advertising system 140 is set correctly on test system 150 depending on what, if any, cookie corresponding to the advertising system 140 is stored on test system 150 (see, e.g., the exemplary embodiment of FIG. 6). Test system 150 may repeat tests to determine whether opt-out system 130 correctly identifies the type of cookie (e.g., opt-out) on test system 150 and that opt-out system 130 displays the correct indicator on the website of opt-out system 130.

According to still further embodiments, test system 150 may test whether an opt-out cookie set on test system 150 functions property. Test system 150 may send a request to a website that is connected (directly or indirectly) to an advertising network corresponding to an advertising system 140. To perform the test, test system 150 may send a request directly to the advertising system 140. The advertising system 140 may respond to the request from test system 150. Test system 150 may run a test to determine whether an opt-out cookie is transmitted to the advertising system 140 with or in response to the request.

After test system 150 determines an outcome of one or more individual tests, test system 150 may generate a report based on the outcome of each test. Test system 150 may log the report in a database or in another form on, for example, an internal storage of test system 150 or a storage device external to test system 150. Additionally, or alternatively, test system 150 may transmit a report through email or other suitable communication means. Reports may be sent to owners or operators of an opt-out system or advertising network or system. Additionally, or alternatively, reports may be transmitted to a third party or members of a specific action group associated with an advertising network or advertising system 140. The members of a specific action group may include one or more persons responsible for fixing any failures identified in a report for a particular test. Test system 150 may also transmit such reports when problems or failures are identified by the outcome of a test (i.e., the outcome of the test is negative).

In accordance with additional embodiments, test system 150 may wait until all tests within a series of different tests are completed in an interval before generating one or more reports. Test system 150 may then organize the information from the reports into different emails for specific entities or action groups. Test system 150 may also organize emails for individual members of the specific action groups that compile information from reports based on an individual member's membership in different action groups. Test system 150 may determine a level of seriousness of any failures or problems identified within a series of different tests. The level of seriousness may be based on the number of problems identified and for what specific tests the problems are identified. When a levels of seriousness is above a predetermined threshold, test system 150 may send an alert email to, for example, a privacy group or a specific individual (e.g., a high level manager) who is not a member of any specific action group.

Test system 150 may use configuration system 160 to perform an automated healing procedure to fix any failures or problems that are detected during any tests. As noted above, problems may be detected when the outcome of a test is negative. Test system 150 may convert troubleshooting information in one or more of the generated reports into machine-readable instructions. Test system 150 may transmit the machine-readable instructions to configuration system 160. Alternatively, test system 150 may first compile the machine-readable instructions and then send the compiled machine-readable instructions to configuration system 160.

Configuration system 160 may communicate with each one of test system 150, advertising system 140, and/or opt-out system 130, either directly or through network 120. Configuration system 160 may include a personal computer, a single server (or component thereof), multiple servers arranged in a network or as a server farm, etc. Configuration system 160 may be implemented independently or as part of test system 150. Configuration system 160 may manage each advertising system 140 and opt-out system 130. Configuration system 160, based on the machine-readable instructions or the compiled machine-readable instructions, may perform one or more of the following steps on at least one of opt-out system 130 and advertising system 140: (1) reboot a server; (2) reconfigure a server; (3) reformat a server; and (4) remove a server from rotation. Test system 150 may rerun a series of different tests after any one of the foregoing steps is performed by configuration system 160 to make sure that the problem or failure has been corrected.

Figure 2:
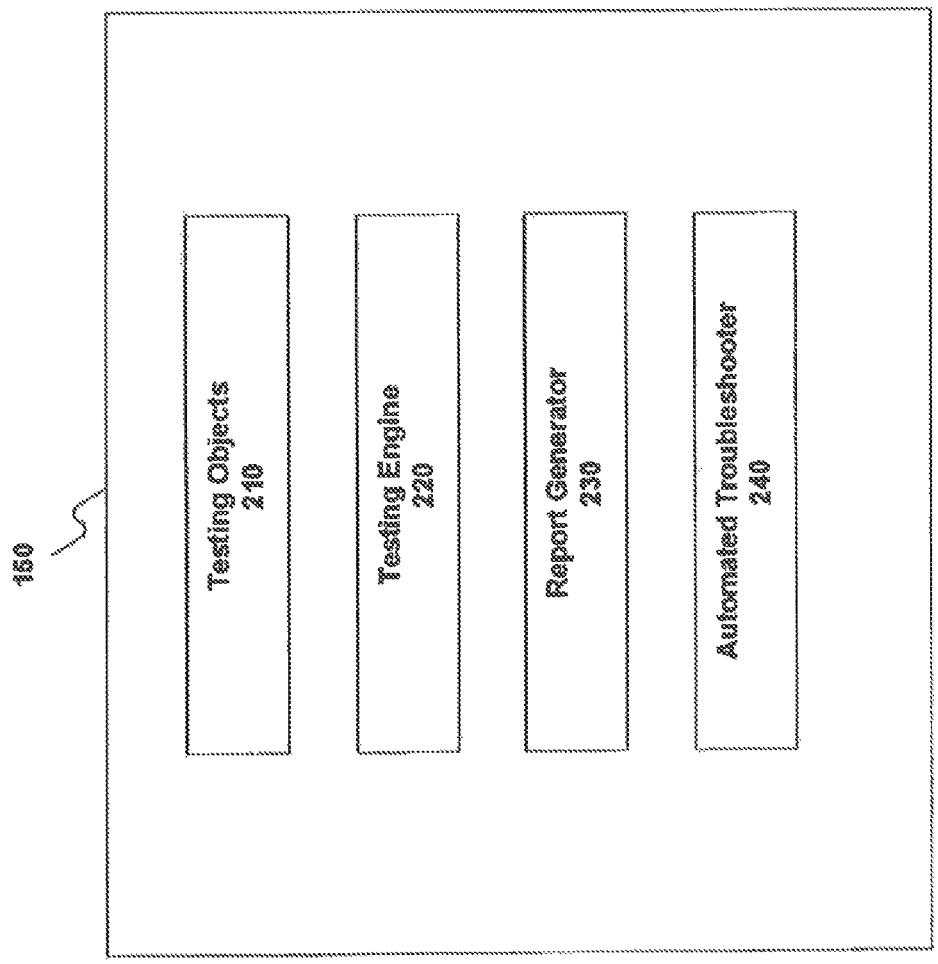
FIG. 2 is a block diagram of an exemplary test system, consistent with a disclosed embodiment.

FIG. 2 depicts an exemplary test system 150, consistent with embodiments of the present disclosure. As illustrated in FIG. 2, test system 150 may include one or more testing objects 210, a testing engine 220, a report generator 230, and an automated troubleshooter 240. As will be appreciated, the above components of test system 150 may be implemented through any suitable combination of hardware, software, and/or firmware.

Testing objects 210 may include one or more independent objects. Each one of testing objects 210 may correspond to a different test performed by test system 150. Each one of testing objects 210 may specify requests desired to be sent to either opt-out system 130 or advertising system 140 from test system 150, to perform each particular test and/or the parameters desired to be set for the requests. Each one of testing objects 210 may also specify the streams desired to be received from either opt-out system 130 or advertising system 140 (e.g., how the streams can be identified) and the important content of the streams. Each one of testing objects 210 may also specify how the content may be analyzed and measured to determine an outcome for each particular test. Each one of testing objects 210 may be run through testing engine 220.

Testing engine 220 may change the settings of test system 150 before executing the tests corresponding to each one of testing objects 210. Testing engine 220 may change settings of test system 150 for each individual test, as needed. Testing engine 220 may also change settings of test system 150 before executing each one of the tests corresponding to each one of testing objects 210, execute each one of the tests, change settings of test system 150 to new settings, re-execute each one of the tests again, etc. Testing engine 220 may compile code needed to execute code corresponding to testing objects 210. Testing engine 220 may transmit a request corresponding to each one of testing objects 210 to either opt-out system 130 or advertising system 140. Testing engine 220 may also receive a stream corresponding to the request from opt-out system 130 or advertising system 140. Testing engine 220 may receive the stream and identify and analyze the contents of the stream. Testing engine 220 may also determine an outcome of each test.

Report generator 230 may compile a report based on a test outcome and/or troubleshooting information associated with each one of testing objects 210. The troubleshooting information may include an outcome for a test, information about a configuration of the tests, network trace information, function(s) that declared an error, various statistics, etc. Report generator 230 may determine who needs to be alerted about a particular compiled report. Report generator 230 may generate an email with the report. Report generator 230 may transmit the email with the compiled report to a single specific action group, multiple specific action groups, a privacy group, specific point of contact, etc.

Automated troubleshooter 240 may determine whether any failures or problems are discovered as a result of the tests (i.e., whether any of the outcomes are negative). If problems are detected, automated troubleshooter 240 may convert the troubleshooting information from one or more reports into machine-readable instructions. Automated troubleshooter 240 may compile the machine-readable instructions. Automated troubleshooter 240 may call configuration system 160 to act upon the troubleshooting information. Automated troubleshooter 240 may transmit the machine-readable instructions to configuration system 160.

Figure 3:
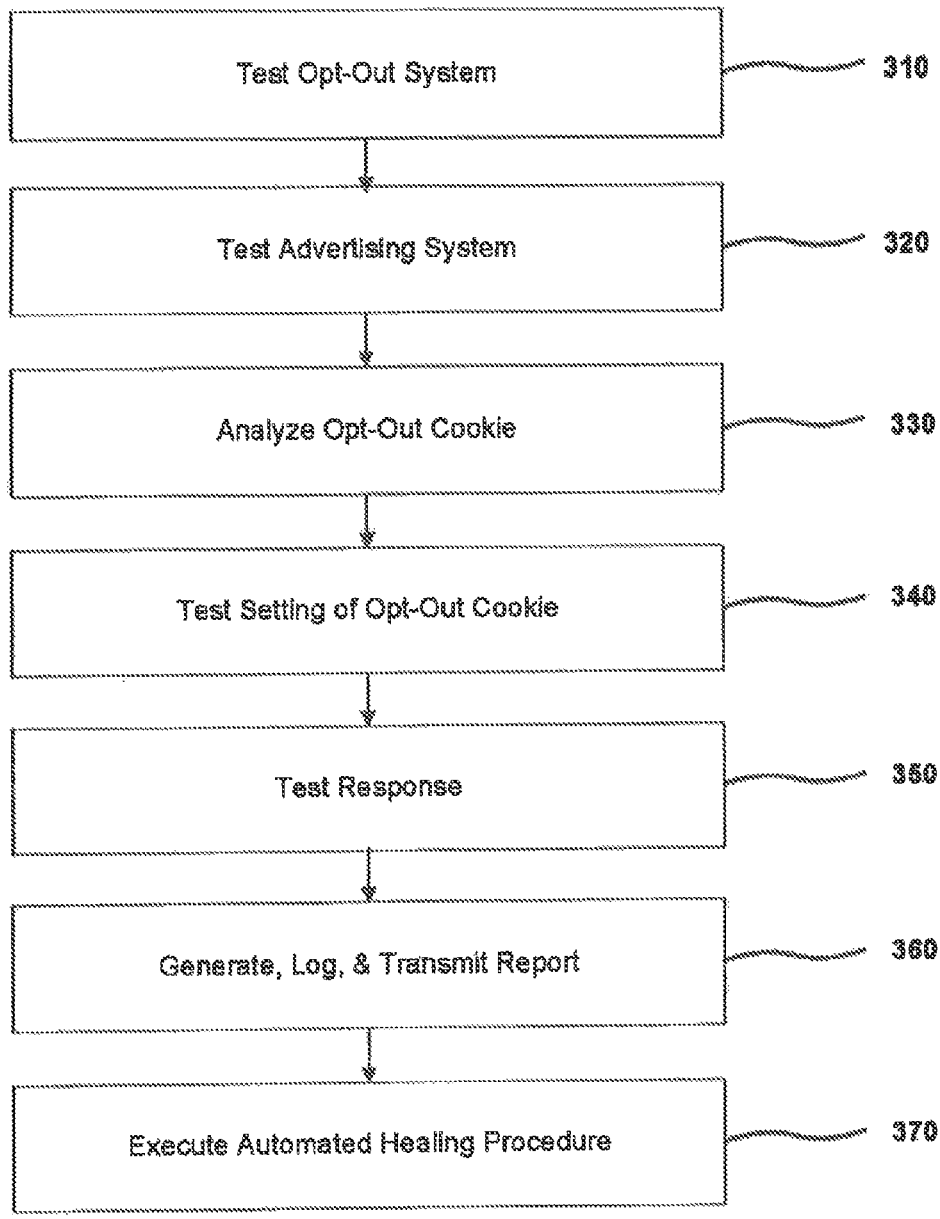
FIG. 3 is a flowchart of an exemplary method for testing an opt-out system, consistent with a disclosed embodiment.

FIG. 3 depicts a flowchart of exemplary method 300 for testing an opt-out system, consistent with embodiments of the present disclosure. Method 300 may be executed using the components of environment 100 illustrated in FIG. 1. According to method 300, at step 310, test system 150 may test opt-out system 130. Test system 150 may test opt-out system 130 by conducting one or more different tests (e.g., a test to determine whether an opt-out website is functioning, a test to determine whether elements to opt-out are present on an opt-out website, a test to determine whether the elements respond properly, a test to determine whether opt-out system 130 interacts property with test system 150, a test to determine whether opt-out system 130 interacts property with each advertising system 140, etc.). As noted above, each one of the different tests may correspond to one of testing objects 210 depicted in FIG. 2.

At step 320, test system 150 may test advertising system 140. The tests for advertising system 140 may include determining whether advertising system 140 properly runs a script to create an opt-out cookie and sends the opt-out cookie to test system 150. At step 330, test system 150 may analyze the opt-out cookie. Test system 150 may analyze the opt-out cookie to determine that the opt-out cookie includes proper values, as described above.

At step 340, test system 150 may determine whether the opt-out cookie is properly set on test system 150. At step 350, test system 150 may test a response of advertising system 140 to make sure that the opt-out instructions are being adhered to by the advertising system 140. For example, test system may send a request (such as a request for an advertisement or other file) to test whether advertising system 140 property responds to an opt-out cookie set on test system 150. In one embodiment, test system 150 transmits the opt-out cookie to advertising system 140 as part of an HTTP request. Test system 150 then monitors an HTTP response from advertising system 140 to make sure, for example, that targeting or tracking cookies are not transmitted by advertising system 140.

At step 360, test system 150 may generate a report based on the outcome of one or more tests. As part of this step, test system 150 may log the report on a database of test system 150 or on some other internal or external storage device. Additionally, test system 150 may transmit the report through email or other communication means to appropriate recipients. As noted above, the appropriate recipients may include at least a specific action group. Step 360 may occur after each one of steps 310, 320, 330, 340, and 350, or after each one of the specific tests conducted within steps 310, 320, 330, 340, and 350.

Optionally, as part of the exemplary method of FIG. 3, a healing procedure may be performed to correct detected problems or failures. More specifically, at step 370, test system 150 may execute an automated healing procedure for opt-out system 130. Step 370 may include, for example, generating machine-readable instructions based on one or more reports, compiling the machine-readable instructions, and prompting configuration system 160 to correct any problems or failures identified in the one or more reports. Test system 150 may repeat one or more of steps 310, 320, 330, 340, 350, and 360, after each attempt by configuration system 160 to correct detected problems in step 370.

Figure 4:
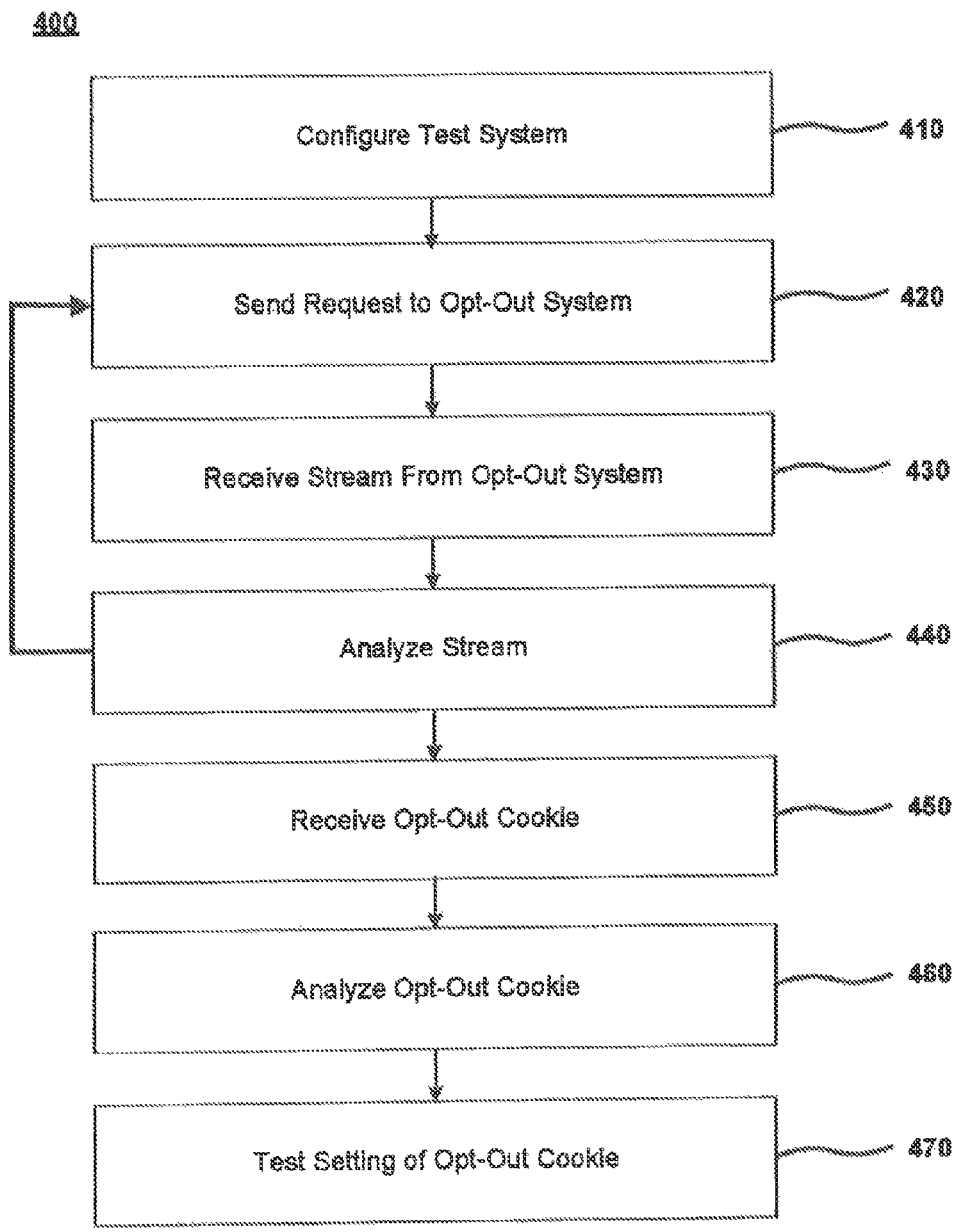
FIG. 4 is a flowchart of another exemplary method for testing an opt-out system, consistent with a disclosed embodiment.

FIG. 4 depicts a flowchart of another exemplary method 400 for testing an opt-out system, consistent with embodiments of the present disclosure. Method 400 may be executed by test system 150 of FIG. 1. According to method 400, at step 410, test system 150 may be configured before any tests are executed. Configuring test system 150 may include simulating or emulating particular environmental conditions on test system 150, as detailed above.

At step 420, test system 150 may send a request, corresponding to one of the tests for opt-out system 130. At step 430, test system 150 may receive a stream from opt-out system 130 in response to the request. Opt-out system 130 may send multiple streams in response to the request. At step 430, test system 150 may selectively determine which one or more streams to receive from opt-out system 130 based on the particular test that is being performed.

At step 440, test system 150 may analyze the received stream. Analyzing the stream, at step 440, may include selecting content from the stream desired to determine an outcome of a test, analyzing the selected content by, for example, measuring values of the contents, and determine an outcome of a test based on the measurements. After step 440 is complete, test system 150 may repeat steps 420, 430, and 440 for subsequent tests of opt-out system 130. Steps 420, 430, and 440 may be included in step 310 of method 300 depicted in FIG. 3.

At step 450, test system 150 may receive an opt-out cookie from advertising system 140. Before step 450, test system 150 may send a request to opt-out system 130 to opt-out of targeted advertising programs of particular advertising networks or advertising systems. The request may prompt each corresponding advertising system 140 to run a script to create the opt-out cookie and send the opt-out cookie to test system 150. As a result, at step 450, test system 150 may receive the opt-out cookie. At step 460, test system 150 may analyze the received opt-out cookie to determine whether values in the cookie are proper. When the received cookie is supposed to be an opt-out cookie (based on the request originally sent by test system 150 to opt-out system 130), test system 150 may analyze whether the values in the cookie are proper for an opt-out cookie.

At step 470, test system 150 may determine whether the received cookie is properly set on test system 150. After step 440 is complete, test system 150 may repeat steps 450, 460, and 470 for subsequent tests. For example, for an alternative test, test system 150 may prompt advertising system 140 to either send an opt-out cookie to test system 150 or request a normal cookie from test system 150. After all tests are complete, test system 150 may restart at step 410. At step 410, test system 150 may re-configure the settings of test system 150 to set new environmental conditions. After the new environmental conditions are set, test system 150 may repeat steps 420, 430, 440, 450, 460, and 470.

Figure 5:
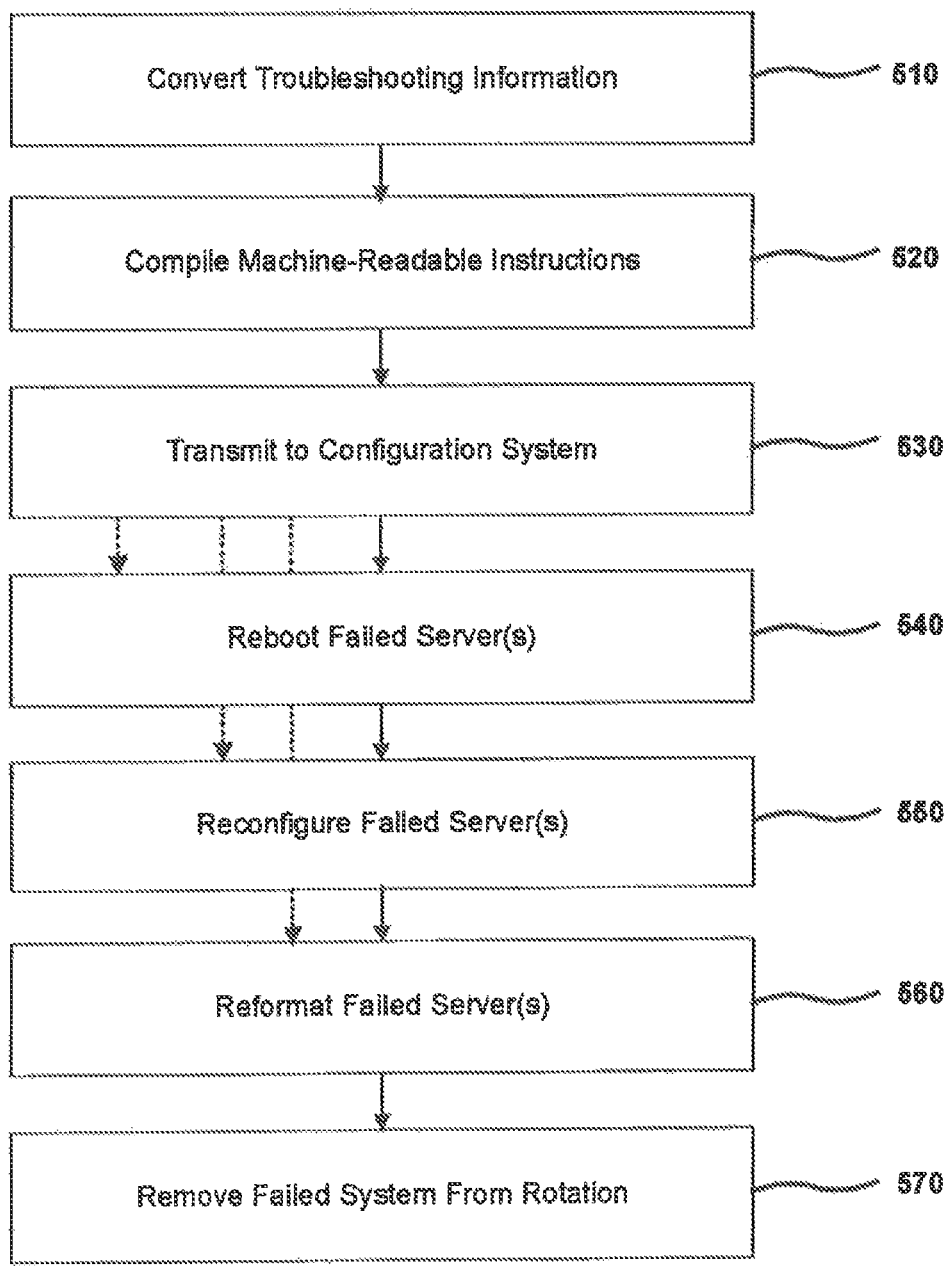
FIG. 5 is a flowchart of an exemplary method for performing an automated healing procedure in an opt-out system, consistent with a disclosed embodiment.

FIG. 5 is a flowchart of an exemplary method for performing an automated healing procedure after test system 150 determines that automated healing is necessary. Test system 150 may determine that automated healing is desired after conducting one or more automated tests of opt-out system 130 and discovering one or more failures/problems (i.e., one or more outcomes of the tests are negative). Method 500 may be executed by test system 150 and/or configuration system 160. According to method 500, at step 510, test system 150 may convert troubleshooting information, detailing a problem detected during one of the tests performed by test system 150, into machine-readable instructions. At step 520, test system 150 may compile the machine-readable instructions. At step 530, test system 150 may transmit the compiled machine-readable instructions to configuration system 160.

At step 540, configuration system 160 may reboot at least one server (or set of servers) of opt-out system 130 and advertising system 140. In the description of steps 540, 550, 560, and 570, opt-out system 130 and advertising system 140, may refer to only one individual physical server (or set of servers) that is responsible for the detected problem (the individual physical server(s) may be described by troubleshooting information). Alternatively, multiple individual physical systems may comprise opt-out system 130 and cookie system 140. Rebooting a server may include first shutting the server down and then powering the server back up. Instead of or in addition to step 540, configuration system 160 may optionally alert test system 150 to re-execute one or more tests of opt-out system 100. Configuration system 160 may alert test system 150 to only re-execute a subset of tests to determine whether a previously discovered problem has been corrected. If test system 150 determines, based on an outcome of a re-executed test, that a problem has not been corrected by rebooting at step 540, configuration system may optionally proceed with step 550 (after repeating steps 510, 520, and 530 and skipping step 540).

At step 550, configuration system 160 may optionally reconfigure at least one server (or set of servers) of opt-out system 130 and advertising system 140. Reconfiguring a server (or set of servers) may include pushing down the most up-to-date configuration file on the server(s). Reconfiguring may also include rebooting the server(s) after the most up-to-date configuration file is pushed down. After step 550, configuration system 160 may alert test system 150 to re-execute one or more tests of opt-out system 100. If test system 150 determines, based on an outcome of a re-executed test, that a problem has not been corrected by reconfiguring at step 550, configuration system may proceed with step 560 (after repeating steps 510, 520, and 530 and skipping steps 540 and 550).

At step 560, configuration system 160 may optionally reformat at least one server (or set of servers) of opt-out system 130 and advertising system 140. After step 560, configuration system 160 may alert test system 150 to re-execute one or more tests of opt-out system 100. If test system 150 determines, based on an outcome of a re-executed test, that a problem has not been corrected by reformatting at step 560, configuration system may proceed with step 570 (after repeating steps 510, 520, and 530 and skipping steps 540, 550, and 560).

At step 570, configuration system 160 may determine whether there is at least one other individual physical server that correctly performs the same role as the individual physical server responsible for a detected problem. For example, there may be at least one other server when opt-out system 130 is comprised of two individual physical servers, where one individual physical server is responsible for the problem and the other individual physical server correctly performs the same role. If there is at least one other server, configuration system 160 may remove the individual physical server responsible for the problem from rotation. Removing the individual physical server from rotation may not allow the server to act as part of opt-out system 130. If there is no other server that correctly performs the same purpose, automated healing may not be successful when the problem is not corrected after steps 540, 550, and 560. The problem may not be corrected until someone, for example, from the specific action group, resolves the problem in response to an alert through email (with a report).

FIG. 6 is a table 600 that illustrates exemplary testing of settings of an opt-out cookie on test system 150, consistent with embodiments of the present disclosure. Table 600 shows examples of what cookies may be present on test system 150 before the setting of an opt-out cookie as part of a test. Test system 150 may be configured to have no cookies (e.g., Present Cookie=None) for an advertising network associated with advertising system 140 before a test is conducted by test system 150. Test system 150 may receive an opt-out cookie corresponding to advertising system 140. Test system 150 may determine that the opt-out cookie is property set on test system 150. Thereafter, test system 150 may send a request to a website associated with advertising system 140 to test that the opt-out cookie is property set.

Test system 150 may also be configured to have a cookie corresponding to advertising system 140 before a test is conducted by test system 150. Test system 150 may receive an opt-out cookie corresponding to advertising system 140. Test system 150 may determine that test system 150 property overrides the advertising system cookie with the opt-out cookie by deleting the advertising system cookie and setting the opt-out cookie.

Test system 150 may also be configured to already have an opt-out cookie for advertising system 140 set on test system 150 before a test is conducted by test system 150. Test system 150 may receive another opt-out cookie for advertising system 140. Test system 150 may determine that test system 150 already has an existing opt-out cookie, that the opt-out cookie is not overridden, that test system 150 does not need the newly received opt-out cookie, and that the existing opt-out cookie continues to be properly set.

Figure 7:
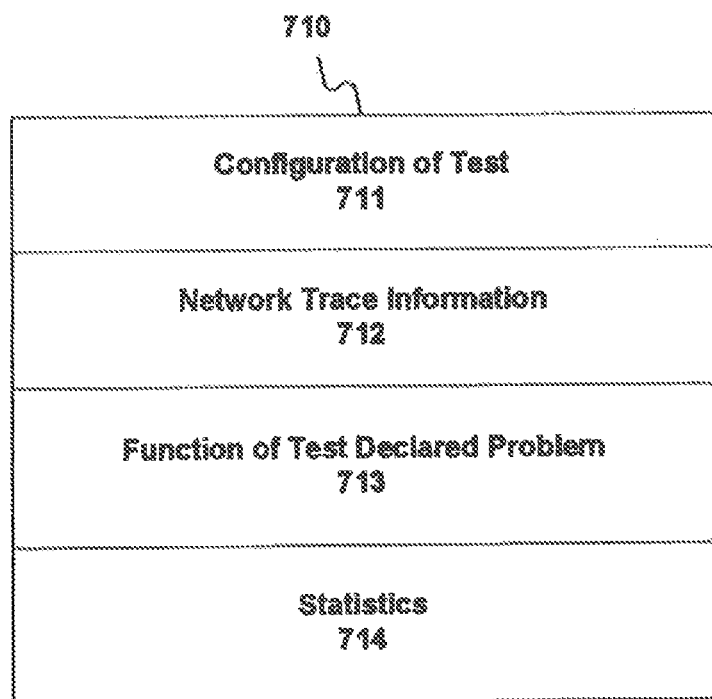
FIG. 7 is a table depicting an example of troubleshooting information generated based on tests performed by a test system, consistent with a disclosed embodiment.

FIG. 7 is a table depicting an example of troubleshooting information 710 for tests performed by test system 150. Troubleshooting information 710 may be compiled into a report by test system 150. As illustrated in FIG. 7, troubleshooting information 710 may include, for example, a configuration of a test 711, network trace information 712, an identification of a function of the test that determined a problem 713, and relevant statistics 714. Configuration of test 711 may include one or more of the following: an identification of the test during which a problem was identified, settings of test system 150 at a time when the test was executed, cookies on the test system 150 at the time when the test was executed, etc. Network trace information 712 may include a detailed history of the test what information was transmitted from test system 150, to what server(s) the information was transmitted from test system 150, what information was transmitted to test system 150, from what server(s) the information was transmitted to test system 150, how any information was transmitted, etc. Examples of network trace information 712 may include information about requests, streams, and transmission information related to the test. Network trace information 712 may include physical identifications of the different servers and network routes used during a test. Relevant statistics 714 may include other information about the execution of the test, history of the execution of the test in the past, etc.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments may be implemented as a combination of hardware and software or in hardware alone. Examples of hardware include computing or processing systems, including personal computers, s, laptops, mainframes, micro-processors and the like. Additionally, although aspects are described for being stored in memory, one skilled in the art will appreciate that these aspects can also be stored on other types of computer-readable media, such as secondary storage devices, for example, hard disks, floppy disks, or CD-ROM, or other forms of RAM or ROM.

Computer programs based on the written description and methods are within the skill of an experienced developer. The various programs or program modules can be created using any of the techniques known to one skilled in the art or can be designed in connection with existing software. For example, program sections or program modules can be designed in or by means of C#, Java, C++, HTML, XML, or HTML with included Java applets. One or more of such software sections or modules can be integrated into a computer system or existing e-mail or browser software.

Moreover, while illustrative embodiments have been described herein, the scope of thereof includes any and al embodiments having equivalent elements, modifications, omissions, combinations (e.g., of aspects across various embodiments), adaptations and/or alterations as would be appreciated by those in the art based on the present disclosure. For example, while embodiments of the present disclosure have been described with respect to the testing of opt-out systems related to advertising networks or advertising systems, embodiments of the present disclosure may also be implemented for other types of opt-out systems or online systems and content. The disclosed embodiments can also be adapted for direct marketing systems and email advertising systems that employ, for example, mailing or solicitation lists. It will be appreciated, for example, the disclosed embodiments may be adapted for a wide variety of opt-out systems, including those pertaining to networks or systems that use cookies or behavioral/targeting information concerning users (e.g., merchant systems).

The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope of equivalents.

The invention claimed is:

1. A computer-implemented method for testing a computer system including an opt-out system, the method comprising the following operations performed by one or more processors:
    sending, by a test system, an opt-out request to the opt-out system, the opt-out request simulating an opt-out request sent from an Internet browser;
    receiving data from the opt-out system in response to the opt-out request sent by the test system; and
    analyzing the data from the opt-out system to determine an outcome of the testing.

2. The computer-implemented method of claim 1, wherein determining the outcome of the testing includes determining that a website associated with the opt-out system is functioning.

3. The computer-implemented method of claim 1, further comprising:
    creating different types of cookies to be stored in the test system,
    wherein the request to the opt-out system includes a request for the opt-out system to identify the types of cookies stored in the test system, and
    wherein the data stream sent from the opt-out system includes identification of the types of the cookies.

4. The computer-implemented method of claim 1, wherein the request to the opt-out system includes a request for the opt-out system to prompt an advertising system to run a script.

5. The computer-implemented method of claim 4,
    wherein the script causes the advertising system to create an opt-out cookie and send the opt-out cookie to the test system, and
    wherein the method further comprises receiving the opt-out cookie from the advertising system.

6. The computer-implemented method of claim 5, further comprising:
    determining that the opt-out cookie received from the advertising system includes a predetermined value.

7. The computer-implemented method of claim 6, wherein the predetermined value includes a lifespan of the opt-out cookie.

8. The computer-implemented method of claim 7, further comprising:
    determining that the lifespan does not exceed a predetermined amount of time.

9. The computer-implemented method of claim 5, further comprising:
    determining that the opt-out cookie received from the advertising system is set correctly on the test system based on a cookie corresponding to the advertising system stored in the test system.

10. The computer-implemented method of claim 5, further comprising:
    determining whether the opt-out cookie received from the advertising system is properly set on the test system by sending a request to a website associated with the advertising system.

11. The computer-implemented method of claim 5,
    wherein the test system stores a cookie corresponding to the advertising system before sending the request to the advertising system, and
    wherein the method further comprises overriding the stored cookie with the opt-out cookie received from the advertising system.

12. The computer-implemented method of claim 4, wherein the request for the opt-out system to prompt the advertising system to run a script simulates a selection made by a user of an advertising network associated with the advertising system.

13. The computer-implemented method of claim 12, further comprising:
   determining that only the advertising network selected by the user, as simulated by the request, is prompted to run the script.

14. The computer-implemented method of claim 1, further comprising:
   sending a request to an advertising system;
   receiving a data stream from the advertising system; and
   determining, based on the data stream received from the advertising system, whether an opt-out cookie previously set on the test system before sending the request to the advertising system is transmitted to the advertising system with the request.

15. The computer-implemented method of claim 1, further comprising:
   analyzing the data from the opt-out system by measuring values associated with the data; and
   determining the outcome of the testing based on the measured values.

16. A test system for testing a computer system including an opt-out system, the test system comprising:
   a storage medium that stores a set of instructions; and
   at least one processor that executes the set of instructions to:
      send, by the test system, an opt-out request to the opt-out system, the opt-out request simulating an opt-out request sent from an Internet browser;
      receive data from the opt-out system in response to the opt-out request sent by the test system; and
      analyze the data from the opt-out system to determine an outcome of the testing.

17. The test system of claim 16, wherein the at least one processor further executes the set of instructions to:
   send a request to an advertising system;
   receive a data stream from the advertising system; and
   determine, based on the data stream received from the advertising system, whether an opt-out cookie previously set on the test system before sending the request to the advertising system is transmitted to the advertising system with the request.

18. The test system of claim 16, wherein the at least one processor further executes the set of instructions to:
   create different types of cookies to be stored in the test system,
   wherein the request to the opt-out system includes a request for the opt-out system to identify the types of cookies stored in the test system, and
   wherein the data stream sent from the opt-out system includes identification of the types of the cookies.

19. A non-transitory computer-readable medium that stores a set of instructions, which when executed by at least one processor, cause the at least one processor to perform operations for testing a computer system including an opt-out system, the operations comprising:
   sending, by a test system, an opt-out request to the opt-out system, the opt-out request simulating an opt-out request sent from an Internet browser;
   receiving data from the opt-out system in response to the opt-out request sent by the test system; and
   analyzing the data from the opt-out system to determine an outcome of the testing.

20. The non-transitory computer-readable medium of claim 19, wherein the operations further comprise:
   sending a request to an advertising system;
   receiving a data stream from the advertising system; and
   determining, based on the data stream received from the advertising system, whether an opt-out cookie previously set on the test system before sending the request to the advertising system is transmitted to the advertising system with the request.

\* \* \* \* \*